(12) United States Patent
Cremin et al.

(10) Patent No.: US 10,284,930 B2
(45) Date of Patent: May 7, 2019

(54) LOW POWER TECHNIQUES FOR SMALL FORM-FACTOR PLUGGABLE APPLICATIONS

(71) Applicant: Microsemi Frequency and Time Corporation, Aliso Viejo, CA (US)

(72) Inventors: Con Cremin, Cork (IE); Yves Cognet, Redwood Shores, CA (US); Anne O'Connell, Cork (IE)

(73) Assignee: Microsemi Frequency and Time Corporation, Aliso Viejo, CA (US)

( * ) Notice: Subject to any disclaimer, the term of this patent is extended or adjusted under 35 U.S.C. 154(b) by 0 days.

(21) Appl. No.: 15/719,080

(22) Filed: Sep. 28, 2017

(65) Prior Publication Data

US 2018/0091877 A1    Mar. 29, 2018

Related U.S. Application Data

(60) Provisional application No. 62/401,058, filed on Sep. 28, 2016.

(51) Int. Cl.
*H04B 10/50* (2013.01)
*H04L 12/26* (2006.01)
(Continued)

(52) U.S. Cl.
CPC ......... *H04Q 11/0003* (2013.01); *H04L 69/22* (2013.01); *H04Q 11/0005* (2013.01);
(Continued)

(58) Field of Classification Search
None
See application file for complete search history.

(56) References Cited

U.S. PATENT DOCUMENTS 6,683,909 B1 * 1/2004 Falco ................ H04N 7/152
348/E7.084
7,633,866 B2 * 12/2009 Han ................... H04Q 11/0067
370/230.1
(Continued)

OTHER PUBLICATIONS

Kamat et al., Unleash the System on Chip using FPGAs and Handel C, 2009, Springer Science+Business Media, pp. 20-21 ( Year: 2009).*

(Continued)

*Primary Examiner* — Kenneth N Vanderpuye
*Assistant Examiner* — Jai M Lee
(74) *Attorney, Agent, or Firm* — Glass & Associates; Kenneth Glass

(57) ABSTRACT

Various electronic devices may benefit from appropriate power conservation techniques and tools. For example, low power techniques may benefit small form-factor pluggable applications. An apparatus can include a packet parsing functionality that includes a first order shallow packet parser configured to operate at line rate and a second order deep packet parser configured to operate only on received filtered packets and received packets destined for a management and/or central processing port. The apparatus can also include a microprocessor configured to manage the apparatus and configured to operate at a low duty cycle. The apparatus can further include a packet generator configured to be active only when generating certain packets of interest. The packet parsing function, the microprocessor, and the packet generator can be configured to provide data from a host port of a small form-factor pluggable device toward an optical port of the small form-factor pluggable device.

17 Claims, 3 Drawing Sheets

(51) Int. Cl.
*H04L 12/28* (2006.01)
*H04Q 11/00* (2006.01)
*H04L 29/06* (2006.01)

(52) U.S. Cl.
CPC .......... *H04B 10/50* (2013.01); *H04L 12/2885* (2013.01); *H04L 43/0811* (2013.01); *H04Q 2011/0049* (2013.01)

(56) References Cited

U.S. PATENT DOCUMENTS

| | | | | |
|---|---|---|---|---|
| 8,509,624 | B2* | 8/2013 | Mattahedin | H04B 10/40 398/12 |
| 8,830,841 | B1* | 9/2014 | Mizrahi | H04L 43/10 370/241.1 |
| 9,025,490 | B2 | 5/2015 | Davari et al. | |
| 9,209,988 | B2* | 12/2015 | Aldaz, Jr. | H04L 12/40013 |
| 9,276,689 | B2 | 3/2016 | Geva et al. | |
| 2002/0172198 | A1* | 11/2002 | Kovacevic | H04N 21/434 370/389 |
| 2003/0185220 | A1* | 10/2003 | Valenci | H04L 12/413 370/398 |
| 2005/0220011 | A1* | 10/2005 | Parker | H04L 47/10 370/229 |
| 2006/0198571 | A1* | 9/2006 | Allouche | H04B 10/40 385/14 |
| 2008/0186969 | A1* | 8/2008 | Klish | H04L 63/0485 370/392 |
| 2009/0060499 | A1* | 3/2009 | Chung | H04B 10/0795 398/34 |
| 2009/0060531 | A1* | 3/2009 | Biegert | H04L 12/2856 398/214 |
| 2009/0109973 | A1* | 4/2009 | Ilnicki | H04L 43/12 370/392 |
| 2009/0214221 | A1* | 8/2009 | Li | H04B 10/40 398/136 |
| 2010/0115316 | A1* | 5/2010 | Diab | H04L 12/12 713/323 |
| 2010/0239252 | A1* | 9/2010 | Davis | H04L 12/2885 398/58 |
| 2012/0121265 | A1* | 5/2012 | Suvakovic | H04B 10/272 398/66 |
| 2012/0275501 | A1* | 11/2012 | Rotenstein | H04J 3/0667 375/220 |
| 2012/0301134 | A1* | 11/2012 | Davari | H04L 41/5038 398/9 |
| 2013/0054565 | A1 | 2/2013 | O'Connell et al. | |
| 2013/0191677 | A1* | 7/2013 | Ziesler | G06F 1/3237 713/500 |
| 2014/0233940 | A1* | 8/2014 | Pitzer | H04B 10/03 398/8 |
| 2015/0200837 | A1* | 7/2015 | McCallen | H04L 43/50 370/242 |

OTHER PUBLICATIONS

Gibb et al., Design Principles for Packet Parsers, 2013, IEEE, pp. 13-24 (Year: 2013).*
Wikipedia, Ethernet frame, 2015 (Year: 2015).*

* cited by examiner

LOW POWER TECHNIQUES FOR SMALL FORM-FACTOR PLUGGABLE APPLICATIONS

CROSS REFERENCE TO RELATED APPLICATION:

This application claims full benefit of and priority to U.S. Provisional Patent Application No. 62/401,058, filed Sep. 28, 2016, titled "LOW POWER TECHNIQUES FOR SMALL FORM-FACTOR PLUGGABLE APPLICATIONS", the disclosure of which is hereby fully incorporated by reference for all purposes.

BACKGROUND

Field

Various electronic devices may benefit from appropriate power conservation techniques and tools. For example, low power techniques may benefit small form-factor pluggable (SFP) applications, such as network interface devices and other devices.

Description of the Related Art

A variety of circuits have been created for processing packets. For example, some switches review only the header of packets in order to decide where to send the packet.

Ethernet operation, administration and management (OAM) circuits contain monitoring points that exchange management messages, particularly connectivity fault management messages and performance monitoring messages.

The standard specifications for operation of Ethernet OAM circuits, and particularly those conforming to IEEE 802.1ag and ITU-T Y.1731, include checks for connectivity and performance measurements between management points (MPs) in a management domain (MD).

Processing can include a search process to identify a receiving monitoring point and also a further process to verify, particularly for continuity check messages, a management endpoint. The search processes can use information carried in a message.

A search engine for the identification of a management point for a management message can include a table containing entries indexed according to a service identifier. Each entry can contain a first address pointer and an identification of which ports out of a multiplicity of ports are associated with valid management points. The search engine can also include logic for generating addresses by a progressive incremental offset of an address indicated by the address pointer in accordance with an ordered count of the instances of the ports associated with the management points.

More details of this and related approaches may be found in U.S. Patent Application Publication No. 2013/0054565, titled "Identification and Verification in Communication Systems," the entirety of which is hereby incorporated herein by reference.

SUMMARY

According to certain embodiments of the present invention, an apparatus can include a packet parsing functionality that includes a first order shallow packet parser configured to operate at line rate and to identify packets requiring further parsing and a second order deep packet parser configured to operate only on the identified packets, e.g. received packets destined for a management and/or central processing port. The apparatus can also include a microprocessor configured to manage the apparatus and configured to operate at a low duty cycle. The apparatus can further include a packet generator configured to be active only when actively generating packets. The packet parsing functionality can be configured to provide data from a host port of a small form-factor pluggable device toward an optical port of the small form-factor pluggable device. The packet parsing functionality can be further configured for data flow in the opposite direction, namely from optical port to host port, or a complementary packet parsing function may be provided.

In certain embodiments, a method of packet processing can include shallow parsing received packets at a line rate so as to identify packets requiring further parsing. The shallow parsing can be performed by a shallow packet parser. The method can also include deep parsing only the identified packets by a deep packet parser. The deep packet parser can be energized only when the identified packets are being deep parsed.

BRIEF DESCRIPTION OF THE DRAWINGS

For proper understanding of the invention, reference should be made to the accompanying drawings, wherein.

DETAILED DESCRIPTION

Figure 1:
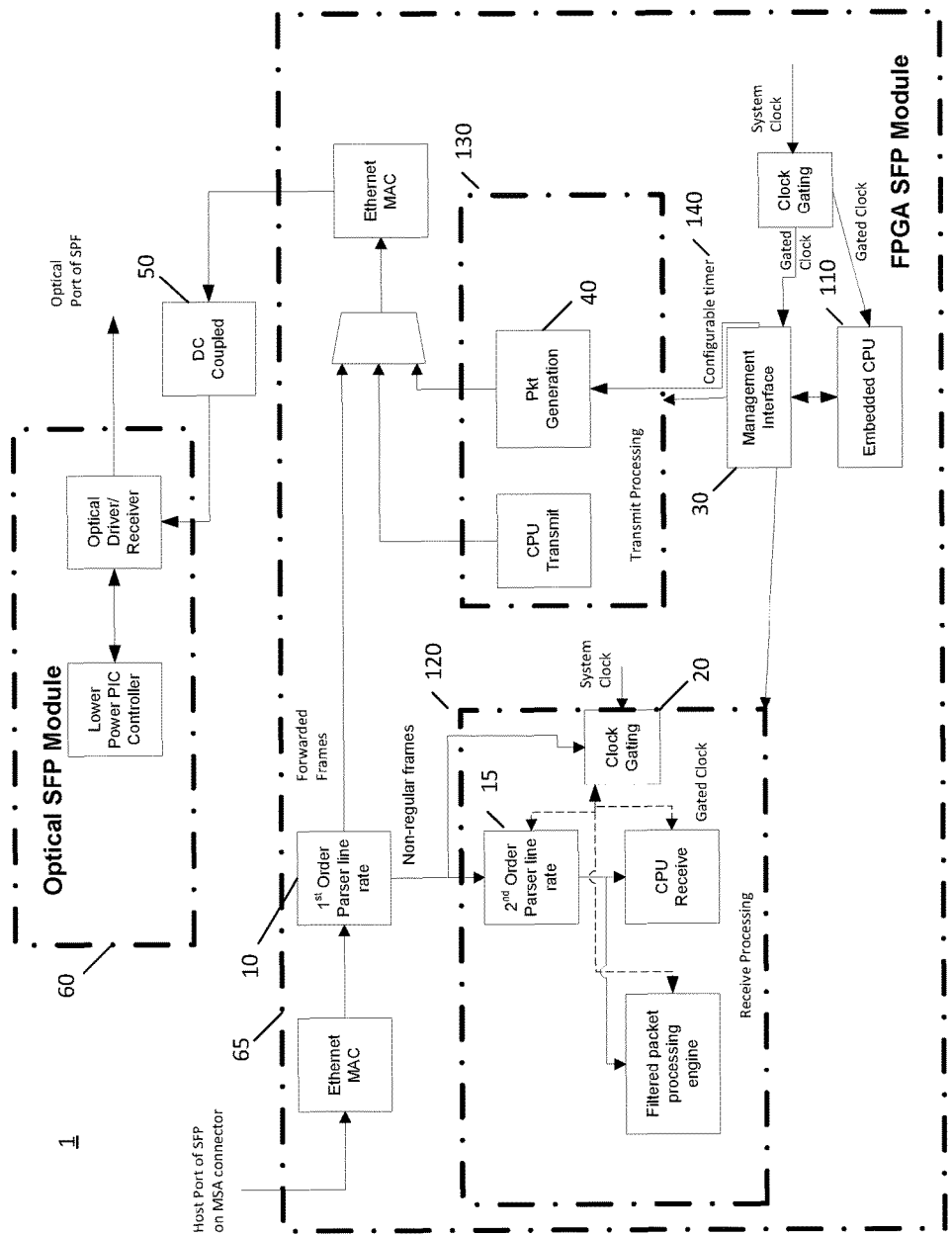
FIG. 1 illustrates an SFP device comprising an optical small form-factor pluggable (SFP) module and a field programmable gate array (FPGA) SFP module, according to certain embodiments of the present invention.

Various embodiments of the present invention may provide techniques for lowering power usage of a circuit. The SFP multi-source agreement (MSA) standard, as published by the Storage Networking Industry Association, of Colorado Springs, Colo. (www.snia.org), currently requires the power dissipation to be less than 1.5 W (see, for example, SFF-8431, section 2.8 "SFP+Power Requirement" and Table 8 "SFP+Module Power Supply Requirements"). All conventional smart SFPs have both limited capabilities, such as being unable to do full network interface device (NID) functionality at wire rate, and/or have power dissipation that exceeds 1.5 W. The 1.5 W of power dissipation includes the power of the optical part (including both receive optical subassemblies and transmit optical subassemblies) and the stacked board where all of the NID/OAM logic resides.

Certain embodiments may provide a way to accomplish the needed processing of packets while still staying below a set power threshold, such as the 1.5 W limit mentioned above or any other desired limit. By way of an example, certain embodiments of the present invention can resemble a system with two processes running in parallel. A first process can operate at low power but can handle 100% of the traffic instantaneously. A second process can be power intensive but can be activated on demand, when specific packets (referred to as non-regular packets or filtered packets below) are detected for which deeper processing is required. In certain embodiments, the percentage of packets needing deeper processing may be, for example, approximately 10%. The line rate of processing may be, for example, 1 Gbps full duplex. Certain embodiments of the present invention may advantageously achieve such a combination, as well as other combinations, of benefits.

For example, certain embodiments of the present invention can limit power dissipation by turning on/off the logic that is being used when the packet is a regular packet. Thus, in the regular packet case there may be no deep processing, and the look up process for the packet and the rest of the logic can be powered off. When the packet is not a regular packet, there can be some deep processing, then some required logic can be powered on and the packet can be processed by the required logic which can then be turned off after processing completion. In the case of not regular packets, a look up table can be used for on demand processing and turning on/off the logic, so it minimizes the power dissipation.

More particularly, certain embodiments of the present invention may include an SFP-NID design that may employ a standard SFP form factor and may meet the SFP power and size specification via a combination of the use of at least some of four power saving techniques described herein. When combined, these four techniques may together drastically reduce the power consumption. These, as well as potentially other, techniques can be used in combination with a printed circuit board assembly (PCBA) stacking technique with thermal contacts to a sleeve, in order to dissipate/regulate power.

A first of the four techniques can be using an FPGA with an embedded processor on a daughter card that may be mounted flipped on/over an optics sub-assembly. The optics subassembly can work independently of the daughter card. This FPGA can have a five times (or any other desired limit) lower quiescent or static current than a similar FPGA from other vendors. Using an FPGA rather than a dedicated application specific integrated circuit (ASIC) may permit a remote update of the design. Specifically, a SmartFusion2® FPGA from Microsemi Corporation of Aliso Viejo, Calif., can reduce the static power by five times. SmartFusion2® is a registered trademark of Microsemi Corporation. SmartFusion2® System on Chip (SoC) FPGAs are devices that integrate an FPGA fabric, an ARM® Cortex®-M3 Processor (from ARM Ltd. of Cambridge, England), and programmable circuitry, offering the benefits of full customization and ease of use.

A second of the four techniques can be, in order to reduce dynamic switching power, building the system around an efficient and fast patented lookup algorithm, such as the approach(es) disclosed in GB2466-7698 corresponding to U.S. Patent Application Publication No. 2013/0054565, mentioned above. This algorithm can perform line rate lookup of all OAM packets. The design can include at least two parallel packet parsers. The first parser, a first order shallow packet parser, can operate on the all received packets and can work in cut through mode without processing the complete content of the Ethernet packets. Cut through mode can refer to a mode in which the packet begins to be forwarded even before the packet has been entirely received. This can minimize the storage of the data packet, which can reduce power consumption. This first parser may always be active but may consume less than 10% of the available power limit. This first parser may be active every time a data packet is received, which may be more than 90% of the time. The first parser can include the functionalities of reading and parsing the packet as well as directing the packet along one or more paths.

The second parser, a second order deep packet parser, can detect and process particular packets of interest, such as OAM packets, at line rate. In the discussion of certain embodiments of the present invention the terms packets and frames can be used interchangeably. This second parser path may consume most of the logic and use most of the embedded memory, thus consuming considerably more power than the first parser, but may be only active for less than 10% of the time. Thus, gating off the clock to logic associated with the second parser when the second parser is not active can greatly reduce power consumption. The two parser paths are preferably designed to operate in parallel at line rate, thus guaranteeing temporal ordering of packets without any buffering or latency variation of data packets.

A third of the four techniques can be that the optical module has its own low power controller to handle the electrical to optical conversion. The system does not have to use the embedded CPU in the FPGA to control this function. Instead the electrical to optical conversion can be completely independent and run in parallel. The embedded CPU in the FPGA can thus be gated off for most of the time, thus reducing power. The FPGA embedded CPU may only become active when the first and second parsers direct a non-regular packet to it, or when it needs to generate a packet, or when it need to run other operations. This partition between optical module and the rest can optimize power at the expense of bill of materials (BOM) and component real estate. As mentioned above, however, some of the component real estate issues can be overcome by stacking the two PCBAs, as described in the first technique.

A fourth of the four techniques can be that the interface between the FPGA and the optical controller is direct current (DC) coupled, thereby reducing size and power. An optical interface to the SFP device may normally or conventionally be alternating current (AC) coupled. Nevertheless, in certain embodiments of the present invention the interface between the FPGA and optical sub assembly can be DC coupled because both sub-assemblies can be in the same power domain within the same overall assembly The above techniques are designated first through fourth merely for convenience, without an implication of the relative importance or relative timing of the various techniques.

FIG. 1 illustrates an SFP device 1 comprising an optical small form-factor pluggable (SFP) module 60 and a field programmable gate array (FPGA) SFP module 65. The block diagram of FIG. 1 shows major components of the data and control paths in SFP device 1. The figure shows one direction of data path flow, namely from host to optics. Data flow can also operate in the opposite direction, although for simplicity of understanding this is not shown in this diagram.

As mentioned above, the system can be power limited. For example, power may be limited to a maximum of 1.5 W for the SFP device 1. The SFP device 1 can include at least two modules: the FPGA based module 65 and the optical module 60. Power reduction techniques can be used on one or both modules.

The SFP device 1 can include an Ethernet medium access control (MAC) module on the host port which receives and frames Ethernet packets.

The SFP device 1 can include a packet parsing functionality split between two processes. Splitting the processing may help to minimize power. A first order shallow packet parser 10, can operate at a 1 Gbs line rate, but may only examine a small portion of the packet contents. For example, in an SFP NID application, the first order shallow packet parser 10 may be limited to examining only up to the first 40 bytes, as discussed in more detail in reference to FIG. 2. The first order shallow packet parser 10 can stop as soon as the first order shallow packet parser 10 knows the destination of the packet. However, the first order shallow packet parser 10 can keep parsing up to 40 bytes. So for example, the first order shallow packet parser 10 may know the destination after 6 bytes, for example if the destination was determined purely on the destination MAC address field of the packet, and thus does not need to process anything after the 6th byte, other than passing the packet on to its destination. This limitation on processing can minimize the logic required and the memory elements required to store the packet bytes. This minimization of logic and memory can, in turn, minimize the power consumed by this process. The first order shallow packet parser 10 can operate at line speed and can determine the destination of the received packet. If the packet is for the FPGA embedded CPU 110 or a packet of interest to the application (for example, an OAM packet in a NID application), then the packet can be directed downwards (direction refers to the drawing, the circuit arrangement can differ) to a second order deep packet parser 15.

If the first order shallow packet parser 10 determines that the packet is to be forwarded to the optical port, then the packet can be directed to the right towards a second MAC module on the interface to the optical module. In addition to only examining the first 40 bytes of the packet, the first order shallow packet parser 10 can also operate in a cut through fashion, in which the packet is directed towards its destination before the whole packet has been received. This cut through mode forwarding can minimize the memory elements required to store the packet prior to starting its transmission, which can contribute to lowering the power requirements of the first order shallow packet parser.

The SFP device 1 can also include a receive processing block 120 that contains a second order deep packet parser 15 that examines and validates the packets directed to it by the first order shallow packet parser 10. The second order deep packet parser 15 can determine if the packets need further packet processing and/or are destined for the CPU. An example of further packet processing is as follows. If the SFP application is a NID, then OAM packets can be packets that require more processing including line rate lookups. Such a line rate lookup scheme is a technique described as "OAM Lookup" in GB2466-7698, which is mentioned above.

The second order deep packet parser 15 may only operate on non-regular packets. These may form only 10% of the packets received on the receiving port, which may be the host or optical port depending on the direction of the data flow. Therefore, receive processing block 120 may only operate about 10% of the time. A clock gating block, labelled (2), can be used to shut off the power to receive processing block 120 during the other 90% of the time. Logic can be provided to detect when a packet is received from the first order shallow packet parser 10. The detection logic can be in the first order parser block and can output a detect signal to the clock gating block, whenever a non-regular frame is detected. This detection of the non-regular frame can enable/disable the clock to be provided to the receive processing block 120 via a clock gating functionality 20. The clock enable can be maintained as long as any of the machines in the receive processing block 120 are active. When the operation of the machines in the receive processing block 120 is complete, the clock can be gated off again by the clock gating functionality 20. For example, the first order shallow packet parser 10 can tell the clock gating functionality 20 to turn the clock on to the receive processing block 120. State machines in the receive processing block 120 can then start, and while they are active, the clock can stay on. When all the machines in the receive processing block 120 are finished, the clock can be turned off again in the clock gating functionality 20. In this way, power may only be consumed in the receive processing block 120 for 10% of the time.

The FPGA SFP module can also include a management interface 30 in communication with the receive processing block 120 and a transmit processing block 130. The management interface 30 can be used by the embedded CPU 110 (which may be an ARM processor) to configure the receive processing block 120 and the transmit processing block 130 and read back status. The embedded CPU 110 can access the receive processing block 120 and the transmit processing block 130 infrequently, for example approximately 10% of the time. A clock gating technique can be used to shut the power to the embedded CPU 110 and to the management interface block off during the other 90% of the time.

A packet generation functionality 40 can be responsible for generating packets for transmission to either the host port or the optical port. Applications may require packets to be generated on specific timer intervals which are user configurable via a configurable timer 140 responsive to the management interface 30. For example, in a NID application, OAM packets can be generated every 3.3 ms, 10 ms, 100 ms or 1 second. The packet generation functionality 40 can be designed to only be active during these times and therefore may only consume power for a very short amount of time. For example in a NID application, if a 100 byte OAM packet is generated every 3.3 ms, and it takes 100×16 ns clock cycles to generate the packet, then the packet generation functionality 40 is only active for 100×16 ns/3.3 ms=0.0005 of the time. For a NID that can generate a total of 128 CCM, 128 DMM, 128 DMR, 128 SLM, 128 SLR messages=640 messages, it means the logic is active for 640*0.0005=32%. During the remaining 68% of the time, the packet generation functionality 40 is not operating and so packet generation functionality 40 can be kept in a low power mode. The configurable timer 140 can be the stimulus to generate a packet. When the configurable timer 140 fires, the state machines in the packet generation functionality 40 can become active. However, the state machines in the packet generation functionality 40 are idle 68% of the time in this example and consuming only minimal power, as they are in a low power state during idle periods. When the packet generation functionality 40 is not active it can be in a low power mode, and when the packet generation functionality 40 is active can consume significantly more power.

As indicated above, the SFP device 1 may also include an optical module 60. There can also be a DC coupled interface 50 between the optical and the FPGA modules. A DC coupled interface 50 can allow lower voltage swing levels to be used, which can reduce the power consumed. DC coupling is possible when, for example, there is no common mode voltage difference between the two modules.

The optical module 60 can include a low power controller specifically dedicated to the optical module 60, such as a lower power peripheral interface controller (PIC). The optical module low power controller can run a continuous control loop on the optical driver and receiver blocks. Because this loop runs continuously, it may not be power efficient to control this loop from the embedded CPU 110 in the FGPA module 65, as the CPU is relatively high powered. Therefore, a split architecture can be employed. A low power controller suitable for the optical control loop is thus preferably dedicated to the optical module 60.

Figure 2:
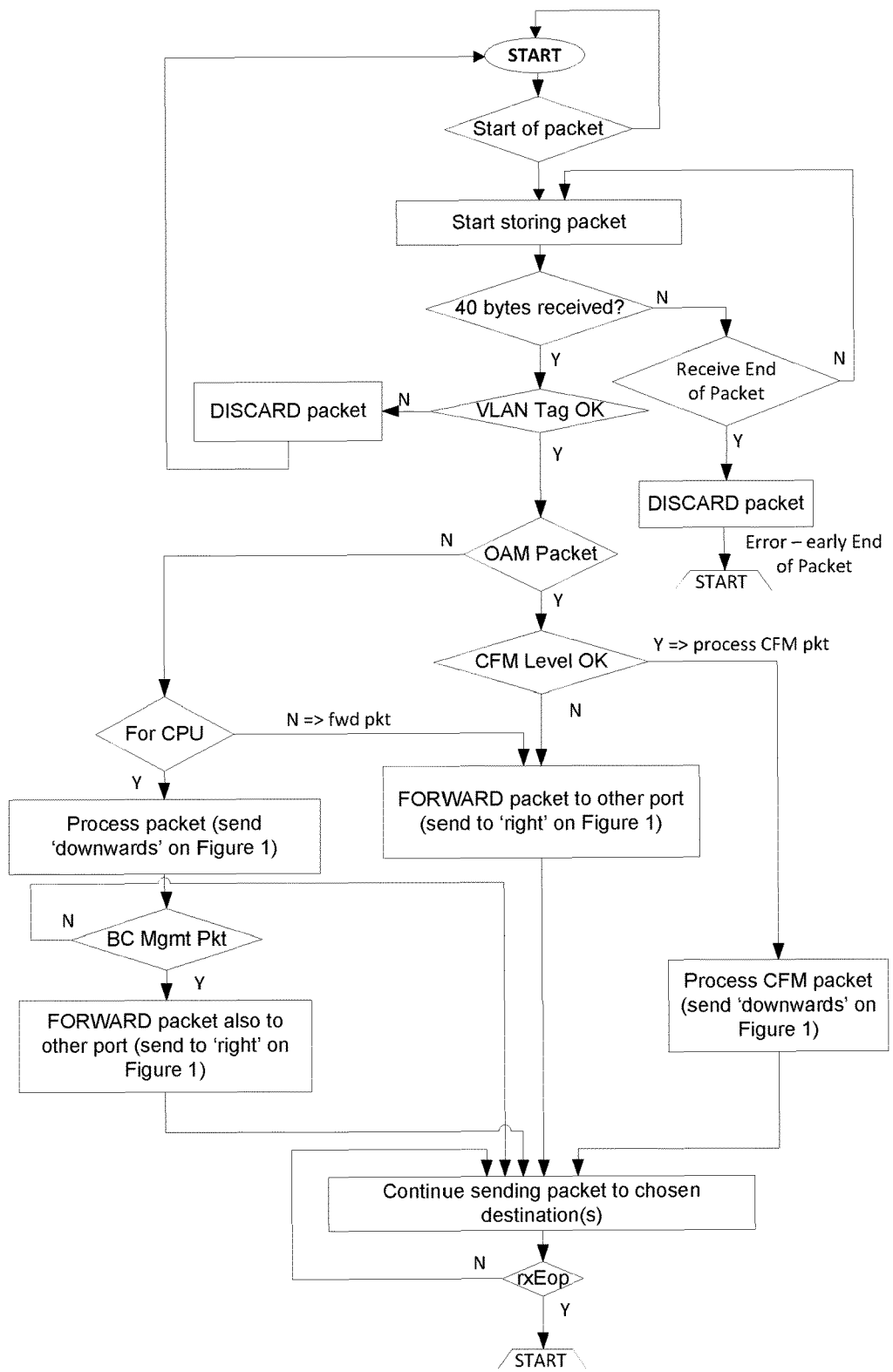
FIG. 2 illustrates a process description of a first order parser, according to certain embodiments of the present invention.

FIG. 2 illustrates a process description of a first order shallow packet parser, according to certain embodiments of the present invention. The following illustrates an example of how only a first 40 bytes may be examined and stored for OAM packets in an SFP NID application.

As shown in FIG. 2, the process can start at the start of a packet. First, storing of the packet is started. The storing can be limited to, for example, 40 bytes maximum. Considering a packet can be 9600 bytes, storing only 40 bytes can be a significant storage saving. It can be determined whether 40 bytes have been received. If not, then it can be determined whether an end of packet has been received. If a packet has ended in less than 40 bytes, then the packet can be discarded and an error "early end of packet" can be generated.

Otherwise, a check can be made as to whether a virtual local area network (VLAN) tag is valid. If not, the packet can be discarded (the complete packet up to end of packet (EOP) can be discarded as it arrives). A VLAN tag consisting of 8 bytes may be located in the $13^{th}$ to $20^{th}$ byte of the packet. Discarding of the packet may comprise setting the destination of the packet to a particular predetermined discard address.

If the VLAN tag is valid, then a check can be made as to whether the packet is an OAM packet or other packet of interest. An OAM packet can be determined by a combination of different fields in the received packet such as the destination MAC Address field, the EtherType field, and OAM Header field, all of which are found in the received first 40 bytes of the packet. The MAC Address can be in bytes 1-6. The EtherType can be in bytes 13-14 if there is no VLAN tag in the packet, in bytes 17-18 if there is one VLAN tag, or in bytes 21-22 if there are 2 VLAN tags. The OAM header can be in bytes 15-18 if there is no VLAN tag in the packet or in bytes 19-22 if there is one VLAN tag or bytes 23-26 if there are 2 VLAN tags.

If the packet is not an OAM packet, a further determination can be made as to whether the packet is for a central processing unit (CPU). A CPU packet can be determined by a combination of different fields in the received packet such as the above mentioned destination MAC Address, the EtherType, and OAM Header field, all of which are found in the received first 40 bytes of the packet.

If the packet is for the CPU, then the packet can be sent onward to second order processing via the second order deep packet parser. Additionally, a check can be made as to whether the packet is a broadcast management packet, which can be a management packet containing a broadcast MAC address of FF-FF-FF-FF-FF-FF. If so, the packet can also be forwarded to the other port, for example the "right" path in FIG. 1. If the packet is not for the CPU, the packet can be forwarded on to the other port (for example toward the optical port, if the packet was received on the host port).

If the packet is an OAM packet, a check can be made as to whether the connectivity fault management (CFM) level in the packet is OK. The CFM level controls how far the packet travels in a network. CFM Level can be determined from OAM Header field, which is found in the received first 40 bytes of the packet. If the CFM Level is not ok, the packet can be forwarded to the other port, for example the "right" path in FIG. 1. If the CFM level of the packet is OK, the packet can be additionally processed, for example on the "down" path in FIG. 1, by the second order deep packet parser.

The process can then involve sending the packet onward toward the chosen destination(s). The process can continue until receiving end of packet (rxEop). The process can then be repeated on each subsequent packet.

In view of the above, certain embodiments of the present invention can relate to an apparatus. The apparatus can include a packet parsing functionality that includes a first order shallow packet parser configured to operate at line rate and a second order deep packet parser configured to operate only on received filtered packets, i.e. packets identified as requiring further processing by the first order shallow packet parser. These packets are typically packets of interest to the application and also packets destined for a management and/or central processing port. The first order shallow packet parser can correspond to, for example, the first order shallow packet parser 10 in FIG. 1 and FIG. 2. The second order deep packet parser can correspond to the second order deep packet parser 15 in FIG. 1. The terms shallow and deep can refer to the depth of inspection of the packet in the parser. For example, the first order shallow packet parser 10 may parse up to a threshold maximum number of bytes, such as 40 bytes. The packet parsing functionality can be implemented in a field programmable gate array. The packet parsing functionality can be configured to operate in cut through mode, as described above.

The apparatus can include a microprocessor, such as embedded CPU 110 of FIG. 1, configured to manage the apparatus and configured to operate at a low duty cycle. The cycle can be considered low if it is operated less than half of the time. A 10% duty cycle is an example of a low duty cycle used in the discussion above, but other low duty cycles such as 5%, 15% or 20% are also permitted. The microprocessor may comprise an ARM processor, for example an ARM® Cortex®-M3 Processor or any other desired processor.

The apparatus can further include a packet generator, such as packet generation functionality 40, configured to be active only when generating packets. For example, the packet generator can be configured to be active only when generating operation, administration and management packets.

The term active, as utilized herein, is specifically directed to power usage. Thus, when inactive, the packet generator and second order deep packet parser, are each reduced to a low power, or off mode. The low power mode utilizes significantly lower power than the packet generator utilizes when it is actively generating a packet. In one embodiment the low power mode presents a reduction of at least 10% in power draw over the quiescent state of the packet generator. Thus, the prior art would allow the packet generator to draw a relatively high quiescent current when it is not generating operation, administration and management packets. The present embodiments advantageously particularly power down, or de-energize, the packet generator when it is not generating operation, administration and management packets. The present embodiments advantageously particularly power down, or de-energize, the deep packet parser when it is not parser a packet identified for further processing by the shallow parser. In one embodiment the low power mode presents a reduction of at least 10% in power draw over the quiescent state of the deep packet parser.

The packet parsing functionality and the microprocessor can be configured to provide data from a host port of a small form-factor pluggable device toward an optical port of the small form-factor pluggable device. The packet parsing functionality and the microprocessor can be further configured to provide data from the optical to the host port. The small form-factor pluggable device can be a device such as, for example, a network interface device. Other small form-factor pluggable devices are also permitted. The packet parsing functionality, the microprocessor, and the packet generator can be provided in a field programmable gate array module, such as a SmartFusion2® FPGA.

The apparatus can also include an optical network interface device module powered by a dedicated low power controller. The controller can be considered low power if it consumes lower power than the main controller of the packet processing section of the device. The optical network interface device module can be DC coupled to the field programmable gate array module.

The apparatus can include an internal management port configured to generate central processing unit packets for transmission out of the host port, the optical port, or both the host port and the optical port. The internal management port can be further configured to process received central processing unit packets from the packet parsing functionality on either the host port of the optical port. The internal management port can be provided in an ARM processor, for example, in embedded CPU 110.

The example of an OAM NID is provided above as one example of devices with respect to which certain embodiments of the present invention. Certain embodiments of the present invention may, for example, be applied to devices such as 1588 boundary clocks, flow based white list/ black list filtering, flow and rule based firewalling, and flow monitoring devices.

A 1588 boundary clock can be a device configured to operate in accordance with the IEEE 1588 precision time protocol (PTP), such as the IEEE 1588-2002 standard or the 1588-2008 revised standard.

A flow-based white list device can be a device configured to operate on flows of packets, wherein permitted flows are those on a configured list for the device, and other packets are blocked or otherwise restricted. Similarly, a flow-based black list device can be a device configured to operate on flows of packets, wherein forbidden or restricted flows are those on a configured list for the device, and other packets are permitted.

A flow-based and/or rule-based firewall can be similarly configured to selectively permit or prevent the passage of packets across a network interface. For example, packets may be subject to a firewall based on header information, deep packet inspection, or some combination thereof The firewall may operate with respect to flows, and may operate based on rules applied to flows or individual packets.

A flow monitoring device can be configured to keep track of various flows across or to a network interface. Optionally, a flow monitoring device may be used alone or in combination with one of the above-mentioned devices, such as a firewall.

Figure 3:
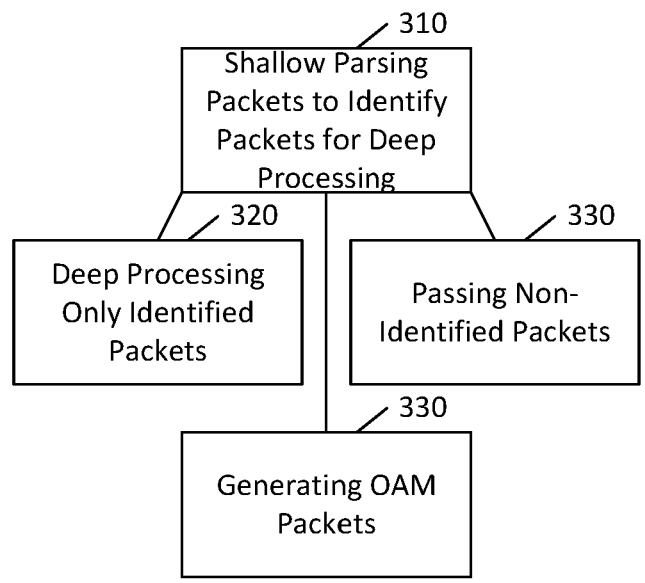
FIG. 3 illustrates a method of packet processing according to certain embodiments of the present invention.

FIG. 3 illustrates a method of packet processing according to certain embodiments of the present invention. As shown in FIG. 3, a method can include, at 310, shallow parsing received packets at a line rate so as to identify packets requiring further parsing. The shallow parsing can be performed by a shallow packet parser. The shallow packet parser can operate in a cut through mode. The method can also include, at 320, deep parsing only the identified packets by a deep packet parser. The deep packet parser can be energized only when the identified packets are being deep parsed.

The method can further include, at 320, passing all packets not identified by the shallow parsing as requiring further processing from a first port to a second port. The first port can be a host port and the second port can be an optical port or any kind of network port.

The method can additionally include, at 340, generating, by a packet generator, operation, administration and management packets for transmission to one of a first port and a second port. The packet generator can be controlled to be in a low power mode when not generating the operation, administration and management packets.

One having ordinary skill in the art will readily understand that the invention as discussed above may be practiced with steps in a different order, and/or with hardware elements in configurations which are different than those which are disclosed. Therefore, although the invention has been described based upon these disclosed embodiments, it would be apparent to those of skill in the art that certain modifications, variations, and alternative constructions would be apparent, while remaining within the spirit and scope of the invention.

We claim:

1. An apparatus comprising:
a first port;
a second port;
a first order shallow packet parser circuit, an input of the first order shallow packet parser circuit coupled to the first port and an output of the first order shallow packet parser circuit coupled to the second port, the first order shallow packet parser circuit configured to operate at a line rate to identify incoming packets received at the first port requiring further parsing and to generate a signal when the incoming packets requiring further parsing are identified, wherein the first order shallow packet parser circuit is further configured to determine whether a virtual local area network (VLAN) tag of each of the incoming packets is valid and discard packets not having a valid VLAN tag and determine whether the incoming packets include an Ethernet operation administration and management (OAM) packet;
a second order deep packet parser circuit coupled to the first order shallow packet parser circuit, the identified packets sent to the second order deep packet parser circuit, the second order deep parser circuit configured to operate only on the identified packets, and wherein the first order shallow packet parser circuit is further configured to send the determined OAM packet to the second port so as to bypass the second order deep packet parser circuit when the determined OAM packet has an acceptable connectivity fault management (CFM) level;
a detection logic circuit coupled to the first order shallow packet parser circuit and coupled to the second order deep packet parser circuit, the detection logic circuit configured to receive the signal and to initiate operation of the second order deep parser circuit when the signal is received, the second order deep packet parser circuit configured to operate on the identified packets and to shut down after operating on the identified packets;
an internal management port coupled to the first port and to the second port, the internal management port including a packet generator configured to be active only when actively generating packets, the packet generator configured to generate outgoing packets for transmission out of the first port or the second port; and
a microprocessor coupled to the second order deep packet parser circuit and to the internal management port, the microprocessor configured to operate at a low duty cycle.

2. The apparatus of claim 1, wherein the first order shallow packet parser circuit, the second order deep packet parser circuit, the detection logic circuit, and the packet generator are configurable logic circuits of a field programmable gate array and wherein the microprocessor is an embedded processor of the field programmable gate array.

3. The apparatus of claim 2 further comprising an optical network interface device module that is DC coupled to the field programmable gate array.

4. The apparatus of claim 1, further comprising an Ethernet medium access control (MAC) module, the first port disposed within the MAC module.

5. The apparatus of claim 1, wherein the first order shallow packet parser circuit is further configured to send each OAM packet not having an acceptable CFM level to the second order deep packet parser circuit.

6. The apparatus of claim 1, wherein the apparatus comprises a small form-factor pluggable device that includes at least one a 1588 boundary clock, a flow-based white list filtering device, a flow-based black list filtering device, a flow-based firewall, a rule-based firewall, or a flow monitoring device.

7. The apparatus of claim 1, further comprising an optical port, the apparatus further configured to provide data from the optical port to the first port.

8. The apparatus of claim 1,
wherein the first order shallow packet parser circuit is further configured to determine whether each incoming packet requires CPU processing, and wherein the first order shallow packet parser circuit is configured to send only those incoming packets that do not require CPU processing to the second port so as to bypass the second order deep packet parser circuit.

9. A method of packet processing comprising:
receiving packets at a first port of an integrated circuit that includes a shallow packet parser circuit, a deep packet parser circuit coupled to the shallow packet parser and an embedded microprocessor
shallow parsing the received packets at a line rate so as to identify packets requiring further parsing, said shallow parsing by the shallow packet parser circuit;
when the received packets comprise an incoming Ethernet operation administration and management (OAM) packet having a valid VLAN tag and having an acceptable connectivity fault management (CFM) level, sending the received OAM packet from the shallow packet parser circuit to a second port of the integrated circuit so as to bypass the deep packet parser circuit;
sending the identified packets from the shallow packet parser circuit to the deep packet parser circuit;
deep parsing only the identified packets at the deep packet parser circuit, the deep packet parser circuit energized only when the identified packets are being deep parsed; and
generating, by a packet generator of the integrated circuit, outgoing packets for transmission to one of the first port and the second port, the packet generator being controlled to be in a low power mode when not generating the outgoing packets.

10. The method according to claim 9, further comprising sending the received OAM packet from the second port to an optical port.

11. The method according to claim 9, further comprising:
sending the incoming OAM packets received at the second port to an optical port of an optical module; and
sending the generated outgoing packets received at the second port to the optical port of the optical module.

12. The method according to claim 9, wherein the packet generator is powered off when not generating the outgoing packets.

13. A small form-factor pluggable device comprising:
an optical network interface device having a dedicated low power controller and having an optical port coupled to the dedicated low power controller; and
an integrated circuit comprising:
a network interface device including a first port;
a second port coupled to the optical network interface device;
a first order shallow packet parser circuit, an input of the first order shallow packet parser circuit coupled to the first port and an output of the first order shallow packet parser circuit coupled to the second port, the first order shallow packet parser circuit configured to operate at a line rate to identify incoming packets received at the first port requiring further parsing and to generate a signal when the incoming packets requiring further parsing are identified, wherein the first order shallow packet parser circuit is further configured to determine whether a virtual local area network (VLAN) tag of each of the incoming packets is valid and discard packets not having a valid VLAN tag and determine whether the incoming packets include an Ethernet operation administration and management (OAM) packet;
a second order deep packet parser circuit coupled to the first order shallow packet parser circuit, the identified packets sent to the second order deep packet parser circuit, and the second order deep parser circuit configured to operate only on the identified packets, and wherein the first order shallow packet parser circuit is further configured to send the determined OAM packet to the second port so as to bypass the second order deep packet parser circuit when the determined OAM packet has an acceptable connectivity fault management (CFM) level;
a detection logic circuit coupled to the first order shallow packet parser circuit and coupled to the second order deep packet parser circuit, the detection logic circuit configured to receive the signal and to initiate operation of the second order deep parser circuit when the signal is received, the second order deep packet parser circuit configured to operate on the identified packets and to shut down after operating on the identified packets;
an internal management port coupled to the first port and to the second port, the internal management port including a packet generator configured to be active only when actively generating packets, the packet generator configured to generate outgoing packets for transmission out of the first port or the second port; and
a microprocessor coupled to the second order deep packet parser circuit and to the internal management port, the microprocessor configured to operate at a low duty cycle.

14. The apparatus of claim 13, wherein the integrated circuit comprises a field programmable gate array, and wherein the first order shallow packet parser circuit, the second order deep packet parser circuit, the detection logic circuit, and the packet generator comprise configurable logic circuits of the field programmable gate array integrated circuit.

15. The small form-factor pluggable device of claim 14, wherein the detection logic circuit comprises a clock gating circuit coupled to the second order deep packet parser circuit, the detection logic circuit configured to initiate operation of the second order deep parser circuit by coupling clock signals to the second order deep packet parser circuit when the signal is received.

16. The small form-factor pluggable device of claim 13 wherein the microprocessor performs operations on the identified packets and wherein incoming packets that are identified as requiring further processing are coupled through the second order deep packet parser circuit to the microprocessor, the microprocessor operable to perform one or more operation on the identified packets prior to sending the identified packets to the second port.

17. The small form-factor pluggable device of claim 14, wherein the optical network interface device is DC coupled to the field programmable gate array.

* * * * *